Patented Mar. 17, 1942

2,276,696

UNITED STATES PATENT OFFICE 2,276,696

MANUFACTURE OF HOMOLOGUES OF UREA

John F. Olin, Grosse Ile, Mich., assignor to Sharples Chemicals Inc., a corporation of Delaware No Drawing. Application October 6, 1939, Serial No. 298,279

9 Claims. (Cl. 260—553)

The present invention pertains to the manufacture of alkyl derivatives of urea. An object of the invention has been to provide a process whereby alkyl homologues of urea, including the cyclo-alkyl derivatives, can be produced economically from simple and inexpensive raw materials.

The invention involves a process by which alkyl ureas may be directly synthesized by the reaction of ammonia, carbon dioxide and alkyl amines. Increasing uses for alkyl derivatives of urea having between 1 and 8 carbon atoms in the alkyl radicals are being found in the chemical industry, and a particular object of the invention has been to provide an economical process for producing compounds of this character, although the invention may be appplied to the manufacture of corresponding derivatives containing more than eight carbon atoms in the alkyl radicals.

In the practice of the invention in the manufacture of mono-alkyl urea, the alkyl amine is mixed with anhydrous carbon dioxide and anhydrous ammonia in an autoclave equipped with an agitator, and is heated to a temperature in excess of 100° C. (preferably between 150 and 250° C.), until the desired reaction has taken place. The reaction mixture is then removed from the autoclave, and will be found to contain carbamic acid salts, water and alkyl ureas. The mixture may then be distilled with steam to effect removal of carbamic acid salts, and further purified by crystallization from organic solvents, such as benzene, acetone, carbon tetrachloride, or alcohols, or from water. The recovered carbamic acid derivatives may be reprocessed, together with ammonia, amine and carbon dioxide in the continued practice of the process.

The invention affords an economical process for the manufacture of mono-alkyl ureas, as well as unsymmetrical dialkyl ureas. Symmetrical dialkyl ureas and tetra alkyl ureas may be produced by a similar technique, involving omission of the ammonia from the reaction mixture.

While the exact mechanism of the reaction is not fully understood, the net effect of the reactions involved in the practice of the invention may be indicated by the following equations:

1.
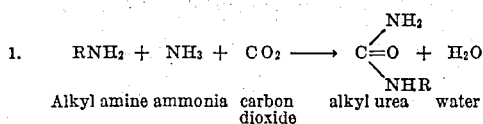
Alkyl amine ammonia carbon dioxide    alkyl urea  water

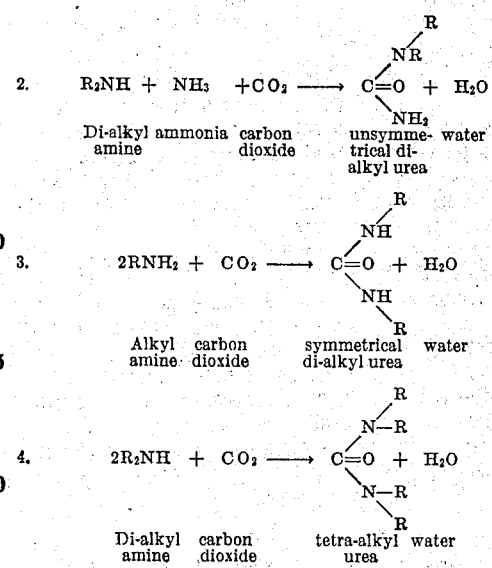

As stated above, the exact mechanism of the reaction is not fully understood. It is believed, however, that the alkyl amine first reacts with carbon dioxide to produce an alkyl carbamic acid, that this alkyl carbamic acid thereafter reacts with ammonia to produce the ammonium salt of the alkyl carbamic acid which is first formed, and that water is thereafter split off from this ammonium salt to produce the desired alkyl urea. Thus, the alkyl amine may first react with carbon dioxide in accordance with the equation 5.
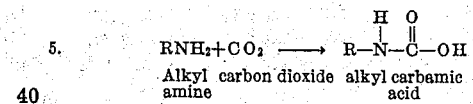
Alkyl  carbon dioxide  alkyl carbamic
amine                    acid and the alkyl carbamic acid may then react with ammonia to produce the ammonium salt thereof in accordance with the equation 6.
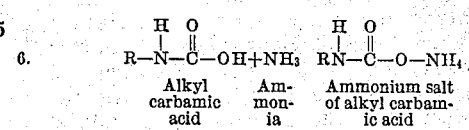
Alkyl      Am-      Ammonium salt
carbamic   mon-     of alkyl carbam-
acid       ia       ic acid The probability that the reaction occurs in the manner just described is indicated by the fact that a substantial amount of the ammonium salt of the alkyl carbamic acid which would be formed in the manner described above is found in the ultimate reaction mixture.

Example I 1740 grams of mono-amyl amine are placed in a stirring autoclave. 880 grams of anhydrous carbon dioxide and 340 grams of anhydrous ammonia are introduced into the autoclave from cylinders. The mass is now heated to a temperature between 160° and 170° C. for four hours, and is kept well stirred during the heating operation. The reaction mixture is now removed from the autoclave and will be found to contain an equilibrium mixture of the ammonium salt of amyl carbamic acid, water, amyl urea and small amounts of symmetrical di-amyl urea. The reaction mixture is distilled with steam to remove the carbamic acid salts. The residue is then further purified by crystallization from aqueous solution, in which the mono-amyl urea is moderately soluble but the diamyl urea is insoluble. The conversion to amyl urea is about 35%, that to diamyl urea, about 2%.

Example II

Symmetrical diethyl urea 900 grams of anhydrous ethylamine are placed in a 2 gallon stainless steel autoclave. The autoclave is now closed and 440 grams of carbon dioxide are introduced by means of a tared cylinder. This causes an exothermic reaction and the material in the autoclave will attain a temperature somewhat above 100° C. The material is now heated with agitation to 180–200° C. where it is kept for two hours (pressure about 2000#/sq. in.). After the autoclave has reached room temperature, the semi-solid mass contained therein is removed and subjected to steam distillation by which the volatile ethyl carbamates are removed. The residue, upon crystallization from hot water, yields s-diethyl urea. The conversion is about 55%.

Example III

Mono-octyl urea 2580 grams (20 mols) of normal octyl amine is placed in a 2 gallon stainless steel autoclave. The autoclave is now closed and 340 grams of anhydrous ammonia and 880 grams carbon dioxide introduced. Heat is applied to the autoclave and with stirring the contents are heated at 200° C. (pressure 3000#/sq. in.) for a period of four hours. After cooling, the contents of the autoclave are withdrawn and subjected to steam distillation to effect removal of octyl carbamates. The residue in the distillation flask is now heated under vacuum to remove water after which it is extracted with hot benzene. Traces of urea are removed by filtration. An equal volume of hexane is added to the filtrate and the resulting solution is chilled to 0° C. By this procedure pure mono-n-octyl urea is obtained.

Modifications will be obvious to those skilled in the art, and I do not therefore wish to be limited except by the scope of the subjoined claims. The invention is applicable, for example, to the manufacture of hydroxy alkyl derivatives of urea by reaction of hydroxy alkyl amines with carbon dioxide and ammonia in accordance with the procedure outlined above for the reaction between the unsubstituted alkyl amines, carbon dioxide and ammonia. The invention is also applicable to the manufacture of cyclo-alkyl derivatives of urea by reaction of cyclo-alkyl amines with carbon dioxide and ammonia, as well as to the manufacture of open chain alkyl derivatives of urea by reaction of the open chain amines with carbon dioxide and ammonia.

I claim:

1. In the manufacture of alkyl derivatives of urea, the process comprising reacting carbon dioxide with an alkyl amine by heating a mixture thereof under super-atmospheric pressure to a temperature between 100° C. and 250° C.

2. In the manufacture of alkyl derivatives of urea, the process comprising reacting carbon dioxide with an alkyl amine and with ammonia by heating a mixture thereof under super-atmospheric pressure to a temperature between 150 and 250° C.

3. In the manufacture of symmetrical dialkyl derivatives of urea, the process comprising reacting carbon dioxide with a molecular excess of an alkyl amine by heating a mixture thereof under super-atmospheric pressure to a temperature between 100° C. and 250° C.

4. In the manufacture of alkyl derivatives of urea, the process comprising reacting carbon dioxide with an alkyl amine and with ammonia by heating a mixture thereof to a temperature between 100° C. and the decomposition temperature of the desired alkyl urea.

5. In the manufacture of alkyl derivatives of urea, the process comprising reacting carbon dioxide with an alkyl amine and with ammonia by heating a mixture thereof to a temperature between 150° C. and 250° C.

6. In the manufacture of alkyl derivatives of urea, the process comprising reacting carbon dioxide with an alkyl amine by heating a mixture thereof to a temperature between 100° C. and the decomposition temperature of the desired alkyl urea, thereafter separating carbamic acid derivatives from the resulting reaction product, and heating said separated carbamic acid derivatives with further quantities of carbon dioxide and alkyl amine to a temperature between 100° C. and the decomposition temperature of the desired alkyl urea in the manufacture of further quantities of the desired alkyl derivatives of urea.

7. In the manufacture of alkyl derivatives of urea, the process comprising reacting carbon dioxide with an alkyl amine and with ammonia by heating a mixture thereof to a temperature between 100° C. and the decomposition temperature of the desired alkyl urea, thereafter separating carbamic acid derivatives from the reaction mixture, and heating said separated carbamic acid derivatives, together with a further quantity of carbon dioxide and alkyl amine to a temperature between 100° C. and the decomposition temperature of the desired alkyl urea in the manufacture of a further quantity of the desired alkyl derivative of urea.

8. In the manufacture of ethyl derivatives of urea, the process comprising reacting carbon dioxide with ammonia and ethylamine by heating a mixture thereof to a temperature between 100° C. and the decomposition temperature of the desired urea derivative.

9. In the manufacture of amyl derivatives of urea, the process comprising reacting carbon dioxide with ammonia and amylamine by heating a mixture thereof to a temperature between 100° C. and the decomposition temperature of the desired urea derivative.

JOHN F. OLIN.